June 18, 1929. H. TORMYN 1,717,634
OUTSIDE FLASH SHEARING MACHINE
Filed Aug. 1, 1927 2 Sheets-Sheet 1

Inventor
Herman Tormyn
by Blackmore,
Spencer & Flinn
Attorneys

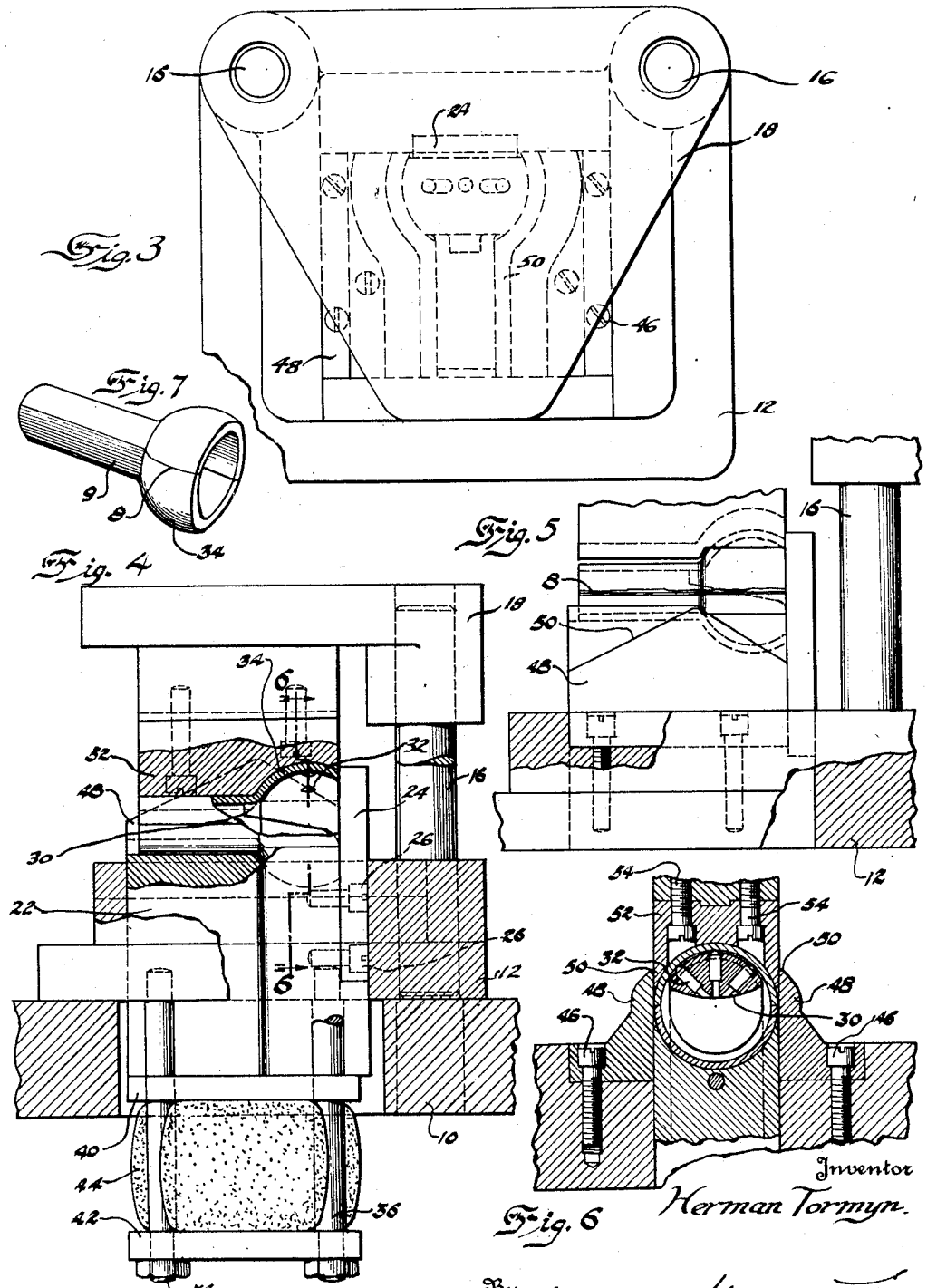

Patented June 18, 1929.

1,717,634

UNITED STATES PATENT OFFICE.

HERMAN TORMYN, OF DETROIT, MICHIGAN, ASSIGNOR TO GENERAL MOTORS CORPORATION, OF DETROIT, MICHIGAN, A CORPORATION OF DELAWARE.

OUTSIDE-FLASH-SHEARING MACHINE.

Application filed August 1, 1927. Serial No. 209,793.

This invention relates to a machine for trimming the rough edges or flash from cylindrical or spherical surfaces formed when two half sections have been welded together. A universal joint ball housing is formed by casting or otherwise shaping the separate half sections and then welding the two parts together. The welding operation leaves two diametrically opposite longitudinal seams with a rough edge or "flash" on the outer and inner side of each seam. A machine for removing the inner rough portion forms the subject matter of my co-pending application for Letters Patent Serial No. 209,794. The object of the present invention is to remove the outer flash by a single operation. To attain this end I have constructed the device illustrated in the drawings and described in detail below.

Other objects of the invention will appear in the course of the following description, taken in connection with the accompanying drawings and appended claims.

In the drawings:

Figure 3 is a plan view.

Figure 4 is a side view with parts broken away, with the parts in the position shown in Figure 2.

Figure 5 is a view taken on the line 5—5 of Figure 1.

Figure 6 is a section on the line 6—6 of Figure 4.

Figure 7 is a perspective view of the work.

Figure 1:
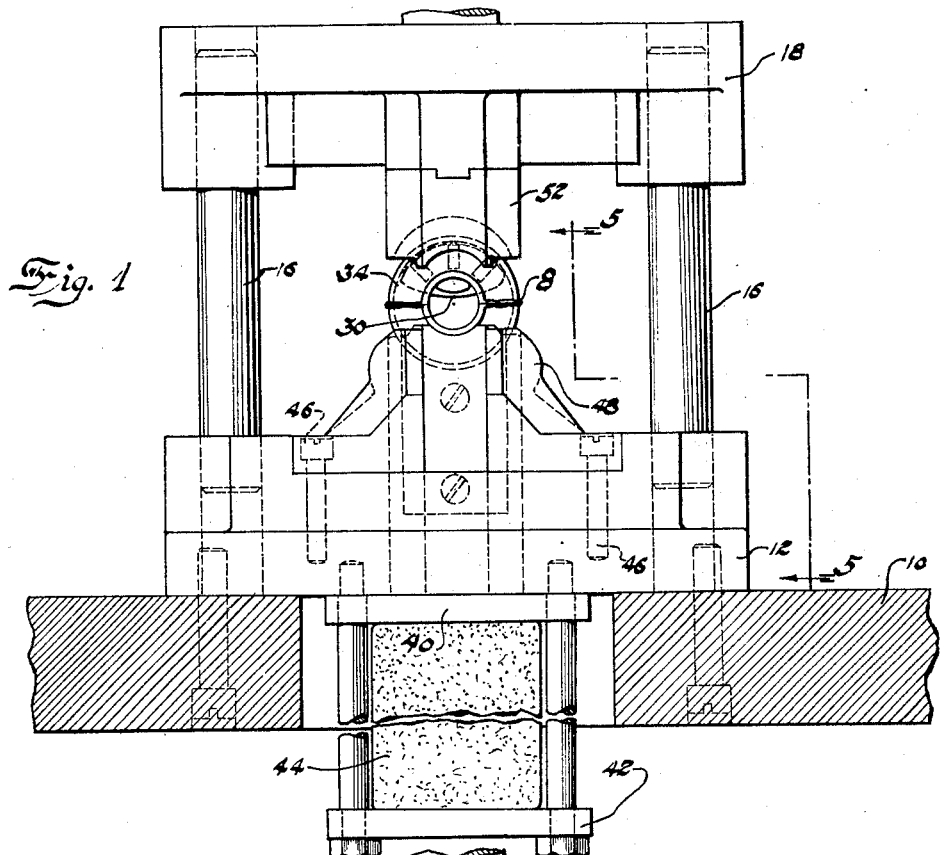
Figure 1 is an end view of the apparatus at the beginning of the stroke.

Referring to the drawings, the numeral 10 indicates a stationary bed or support on which is rigidly fixed the base 12 of the apparatus. The support 10 and base 12 are provided with registering vertical slots which permit vertical reciprocation of the guide rods 16 on which is rigidly fixed the operating section 18 of the apparatus.

The lower die comprises a front member 22 and a rear member 24, fixed together by means of countersunk screws 26 and vertically slidable in a correspondingly shaped groove in the base 12. The front member 22 is provided with a groove for accommodating the lower half of the cylindrical shank 9 of the work while the rear member 24, which is somewhat wider, is formed with a forwardly extending abutment 30 provided with sunken radially extending pointed spokes or pins 32 which fit against the inner side of the enlarged end 34 of the work 9.

As indicated above, the work 9 comprises two half sections, semi-cylindrical in cross-section, which have been welded together, leaving "flashes" 8 of metal on each side. Obviously the machine illustrated may be used on "works" of various shapes, it being necessary of course, to vary the shape of the cutting elements to correspond to the shape of that particular work. The lower end of the member 22 rests upon the plate 40. Between the plates 40 and 42 is the cushion 44 of some compressible material such as rubber. The lower plate 42 is held against downward movement by four bolts 36 extending down from the base 12 through apertures in the plates and the cushion. The upper plate 40 is permitted limited downward movement against the resistance of the cushion.

Fixed in a sunken portion of the base 12 by means of screws 46 are the cutting elements 48, provided with cutting edges 50. The cutting edge of each cutting element follows the contour of the work.

Fixed to the underside of the operating section 18 by means of screws 54 is the upper die 52. This element is provided with a groove which fits the contour of the upper half of the work. The moving section is connected with some means (not shown) by which it may be vertically reciprocated. This means may be actuated by power or by hand as may be desirable.

The operation of the device is as follows.

Figure 2:
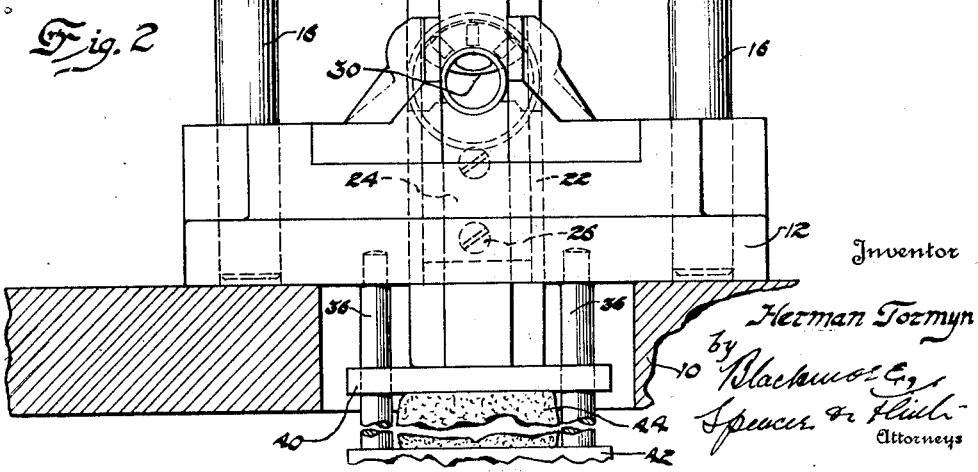
Figure 2 is a similar view taken at the end of the stroke.

The work is put in place as illustrated, with the flashes in the same horizontal plane. During the initial part of the downward stroke of the operating mechanism, the upper section alone moves till the upper die clamps over the work as shown in Figures 2 and 4. During the rest of the stroke, the two dies move down together. Downward movement of the lower die is resisted by the cushion with the result that the upper die forces the enlarged part 34 down on the three circumferentially arranged points of the spokes or pins 32 and holds the work against rotation. As the work is pushed on down, the flash on each side is sheared off by the blades 50. During upward movement of the operating mechanism, the lower die is moved upward by expansion of the cushion 44 until the plate 40 abuts against the under side of the base 12. The upper section 18 then moves upward alone. The work is then removed, another inserted and this operation repeated.

I claim:

1. A machine for removing the flash from a metallic structure comprising a support, a die movable relative thereto, means for resiliently holding said die in a predetermined position, a reciprocable element adapted to move said die against the resistance of said resilient means, and a cutting element adjacent the path of said die.

2. A machine for removing the flash from a metallic structure comprising a support, a die movable relative thereto, means for resiliently holding said die in a predetermined position, a movable element mounted to move said die against the resistance of said resilient means, and a cutting element adjacent the path of the die and on each side thereof.

3. A machine for removing the flash from a hollow metallic structure comprising a support, a die movable relative thereto, a portion of said die extending to a position adapted to contact the inner side of the hollow structure, means for resiliently holding said die in predetermined position, a reciprocable element adapted to move said die, and a cutting element adjacent the path of said die.

4. A machine for removing the flash from a hollow metallic structure comprising a support, a die movable relative thereto, a portion of said die extending to a position adapted to contact the inner side of said metallic structure, means for resiliently holding said die in a predetermined position, a reciprocable element adapted to move said die, and a cutting element adjacent the path of said die and on each side thereof.

5. A machine for removing the flash from a metallic structure comprising a support, a cushion supported adjacent said support, a die movable relative to the support and positioned by said cushion, a reciprocable element adapted to move said die, and a cutting element adjacent the path of said die.

6. A machine for removing the flash from a metallic structure comprising a support, a cushion mounted on said support, a die movable relative to the support and positioned by said cushion, a reciprocable element adapted to move said die, and a cutting element adjacent the path of said die.

7. A machine for removing the flash from a metallic element comprising a support, a die movable relative to said support, a movable element adapted to move said die, a cutting element adjacent the path of said die, and elastic means for moving said die back to its original position.

8. A machine for removing flash from a welded article including a pair of spaced cutters, and a pair of separable reciprocable die elements between the cutters, one of which is movable relative to the other to clamp the article therebetween, after which said die members are movable in unison to carry said article between said cutters.

9. A machine for removing flash from a welded article including a pair of cutters extending in spaced parallel relation with each other, and a pair of separable clamping elements between which a welded article is to be held, said elements being reciprocable in unison between said spaced cutters.

10. A machine for removing flash from a welded article including a pair of cutters extending in spaced parallel relation with each other, a member interposed between said cutters, a spring element against which said member bears, a reciprocatory member adapted to cooperate with said first mentioned member to clamp an article to be operated upon therebetween and to cause the movement of the article past the cutters against the tension of said spring element.

11. A machine for shearing material from an article including a stationary cutter, a relatively movable article engaging member associated therewith, an elastic element against which said member bears, and a reciprocatory member adapted after an initial independent movement to engage with the article and to cooperate with said article engaging member to clamp and move the article past said cutter and against the tension of said elastic element.

12. A machine for shearing material from an article including a pair of separable clamping elements, a resilient support for one of the elements, a reciprocatory carrier for the other element adapted upon operation to close said elements upon an article and to move them in unison, and a cutter adjacent the path of movement of said elements adapted to shear off a portion of the material of the article clamped between said separable elements.

13. A machine for shearing flash from a hollow article, including a shearing device, a pair of separable clamping elements, means associated with one of the elements to extend into and engage with the inside of the hollow article to hold the same against rotation, and a reciprocatory carrier for the other of the elements adapted to close said elements upon an article and move the same past said shearing device.

14. A machine for shearing flash from a hollow article, including a pair of separable clamping elements, a lateral projection carried by one of the elements to extend into the hollow article, a reciprocatory carrier for the other element adapted upon operation to close the elements upon the article and move them in unison, and a shearing device adjacent the path of unison movement of said elements.

15. The structure of claim 14 wherein the lateral projection is provided with a series of pointed pins for engagement with the inside of the hollow article.

16. The structure of claim 14 where the lateral projection is provided with a roughened surface for engagement with the article to hold it against displacement.

In testimony whereof I affix my signature.

HERMAN TORMYN.